United States Patent
Kato et al.

(10) Patent No.: US 8,064,307 B2
(45) Date of Patent: Nov. 22, 2011

(54) REPRODUCING DEVICE, REPRODUCING METHOD AND PROGRAM USED IN THE SAME

(75) Inventors: Makoto Kato, Tokyo (JP); Kiichiro Asaba, Tokyo (JP)

(73) Assignee: EMT Co., Ltd., Tokyo (JP)

( * ) Notice: Subject to any disclaimer, the term of this patent is extended or adjusted under 35 U.S.C. 154(b) by 496 days.

(21) Appl. No.: 12/211,691

(22) Filed: Sep. 16, 2008

(65) Prior Publication Data

US 2010/0067340 A1    Mar. 18, 2010

(51) Int. Cl.
*G11B 11/00* (2006.01)

(52) U.S. Cl. ................................... 369/53.21

(58) Field of Classification Search ............... None
See application file for complete search history.

(56) References Cited

U.S. PATENT DOCUMENTS

| | | | | |
|---|---|---|---|---|
| 7,215,610 | B2 * | 5/2007 | Sako et al. ............. | 369/47.12 |
| 7,789,314 | B2 * | 9/2010 | Karstens ............. | 235/492 |
| 2003/0117920 | A1 * | 6/2003 | Sako et al. ............. | 369/53.21 |
| 2005/0111342 | A1 * | 5/2005 | Wisnudel et al. ......... | 369/275.3 |
| 2006/0085602 | A1 * | 4/2006 | Huggahalli et al. ......... | 711/137 |
| 2006/0253692 | A1 * | 11/2006 | Ferren et al. ............. | 713/1 |
| 2010/0034068 | A1 * | 2/2010 | Aksamit et al. ............. | 369/53.21 |

FOREIGN PATENT DOCUMENTS

| | | |
|---|---|---|
| JP | 2002-007194 | 1/2002 |
| JP | 2002-251326 | 9/2002 |

* cited by examiner

*Primary Examiner* — Joseph Feild
*Assistant Examiner* — Huy Nguyen
(74) *Attorney, Agent, or Firm* — Dickstein Shapiro LLP

(57) ABSTRACT

There is provided, according to the present invention, a reproducing device capable of preventing illegal duplication and reproduction, as well as of reproducing content without degrading the quality of the audio and visual contents.

The reproducing device (100) comprises a first storage area (110), in which data is stored, using file system which is not supported by operating system of the reproducing device, an interface part (120) supporting the file system which the first storage area uses, accepting only reproducing request, reading out and supplying the data stored in the first storage area, wherein the reading out and supplying operations are hidden, and a reproducing part (132) reproducing the data supplied by the interface part.

12 Claims, 9 Drawing Sheets

REPRODUCING DEVICE, REPRODUCING METHOD AND PROGRAM USED IN THE SAME

BACKGROUND OF THE INVENTION

1. Field of the Invention

The present invention relates to a reproducing device, a reproducing method and a program used in the device and method, particularly relates to a reproducing device, a reproduction method and a program for reproducing audio and visual contents by network distribution.

2. Description of Related Art

Digital sound source and moving picture have replaced analog ones and digital audio-visual system, sound source content, visual content, media and the like have been available as well. However, since digital content is easily duplicated, various techniques have been provided for copyright protection of the content.

As prior art to realize the download processing suitable for copyright-protected data, an information processing device and its method are disclosed, in which a privileged space is set in an information processing space, and a download program and a recording medium interface program are allowed to operate in the privileged space. Then, download data whose copyright protection is necessary are recorded in an external storage medium by processing in the privileged space so that it is possible to prevent any direct access to the external recording medium from a user program or the like arranged in an unprivileged space (see JP2002-7194).

SUMMARY OF THE INVENTION

As mentioned above, various techniques have been proposed for copyright protection of content. However, those techniques achieve duplication prevention and encryption by processing audio and visual contents, which results in degradation of the quality of audio and visual contents. In addition, in the current music distribution systems, sound source content is often lossy compressed in order to reduce the network load in distributing the sound source content. Therefore, much more attention has been paid to prevention of duplication and encryption method for copyright protection and reduction of network load than sound quality.

It is, therefore, an object of the present invention to provide a reproducing device capable of preventing illegal duplication and reproduction, as well as of reproducing content without degrading the quality of the audio and visual contents.

A reproducing device according to the first invention comprises a first storage area, in which data is stored, using file system which is not supported by operating system of the reproducing device, an interface part supporting both of the file system which the first storage area uses and file system supported by the operating system of the reproducing device, including a user interface part accessible from outside of the reproducing device, and an acquiring and reproducing interface part(s) accepting only reproducing request for reproducing the data stored in the first storage area, supplied through the user interface part, reading out and supplying the data stored in the first storage area, wherein the reading out and supplying operations are hidden, and a reproducing part for reproducing the data supplied through the interface part, using the file system supported by the operating system of the reproducing device.

In the reproducing device according to the second invention, the reproducing request is a stream-reproducing request, the interface part reads out the data stored in the first storage area and supplies the date to the reproducing part in a stream-reproducing form, and the reproducing part is configured as a stream-reproducing part for stream-reproducing the data supplied to in the stream-reproducing form.

In the reproducing device according to the third invention, the interface part further comprises a monitoring part for judging whether the operating system of the reproducing device is secure or not, when the monitoring part judges that the operating system is secure, the acquiring and reproducing interface part reads out the data stored in the first storage area and supplies the data to the reproducing part, when the monitoring part judges that the operating system is not secure, the interface part changes the operating system in a secure state, afterward, the acquiring and reproducing interface part reads out the data stored in the first storage area and supplies the data to the reproducing part, the interface part controls the operating system kept in the secure state, and the reproducing part reproduces the supplied data.

In the reproducing device according to the forth invention, the reproducing device further comprises a second storage area used by the reproducing part, the interface part further comprises a monitoring part for judging whether the second storage area is a secure storage area (a storage area kept in secret) or not, when the monitoring part judges that the second storage area is a secure storage area, the acquiring and reproducing interface part reads out the data stored in the first storage area and supplies the data to the second storage area, when the monitoring part judges that the second storage area is not a secure storage area, the interface part changes the second storage area in a secure state, afterward, the acquiring and reproducing interface part reads out the data stored in the first storage area and supplies the data to the second storage area, the interface part keeps the second storage area in the secure state, and controls the second storage area so that the data supplied to the second storage area is stored, and the reproducing part reproducing the data stored in the second storage area.

In the reproducing device according to the fifth invention, the data stored in the first storage area, readout operation of the data and supplying operation of the data are hidden by encapsulation.

In the reproducing device according to the sixth invention, the data stored in the first storage area is encoded, and the acquiring and reproducing interface part decodes the encoded data.

In the reproducing device according to the seventh invention, the interface part comprises an initializing part having a formatting capability to format the first storage area in a file system which is not supported by the operating system of the reproducing device.

The reproducing device according to the eighth invention, further comprises a communication part accepting only an acquiring request for acquiring new data, acquiring new data from an external data supply device (via networks such as the Internet, a CD/DVD drive and a sound card), and storing the acquired new data in the first storage area, in which the storing operation is hidden.

In the reproducing device according to the ninth invention, the acquired new data and the storing operation are hidden by encapsulation.

In the reproducing device according to the tenth invention, the second storage area is an auxiliary storage device. As an auxiliary storage device are listed what is connected to an external port such as a USB memory or what is connected via network.

A method for reproducing a reproducing device according to the eleventh invention comprises a step of storing data in a first storage area using a file system which is not supported by operating system of the reproducing device, a step of reading out and supplying the data stored in the first storage area by using an acquiring and reproducing interface part accepting only reproducing request for reproducing the data stored in the first storage area, supplied from outside of the reproducing device, in an interface part supporting both of the file system which the first storage area uses and file system supported by the operating system of the reproducing device, wherein the reading out and supplying operations are hidden by using computing means (a processor such as a CPU), and a step of reproducing data supplied by the acquiring and reproducing interface part by using computing means (a processor such as a CPU).

A program for a computer to perform a reproducing method according to the twelfth invention, the program comprises a step of storing data in a first storage area using a file system which is not supported by operating system of the reproducing device by using computing means (a processor such as a CPU), a step of reading out and supplying the data stored in the first storage area by using an acquiring and reproducing interface part accepting only reproducing request for reproducing the data stored in the first storage area, supplied from outside of the reproducing device, in an interface part supporting both of the file system which the first storage area uses and file system supported by the operating system of the reproducing device, wherein the reading out and supplying operations are hidden by using computing means (a processor such as a CPU), and a step of reproducing data supplied by the acquiring and reproducing interface part.

According to the present invention, it is possible to provide a reproducing device capable of realizing robust copyright protection by preventing illegal duplication and reproduction, as well as of reproducing high-quality audio and visual contents because no process is required such as compression of content accompanied with quality degradation of content.

DESCRIPTION OF THE PREFERRED EMBODIMENTS

Figure 1:
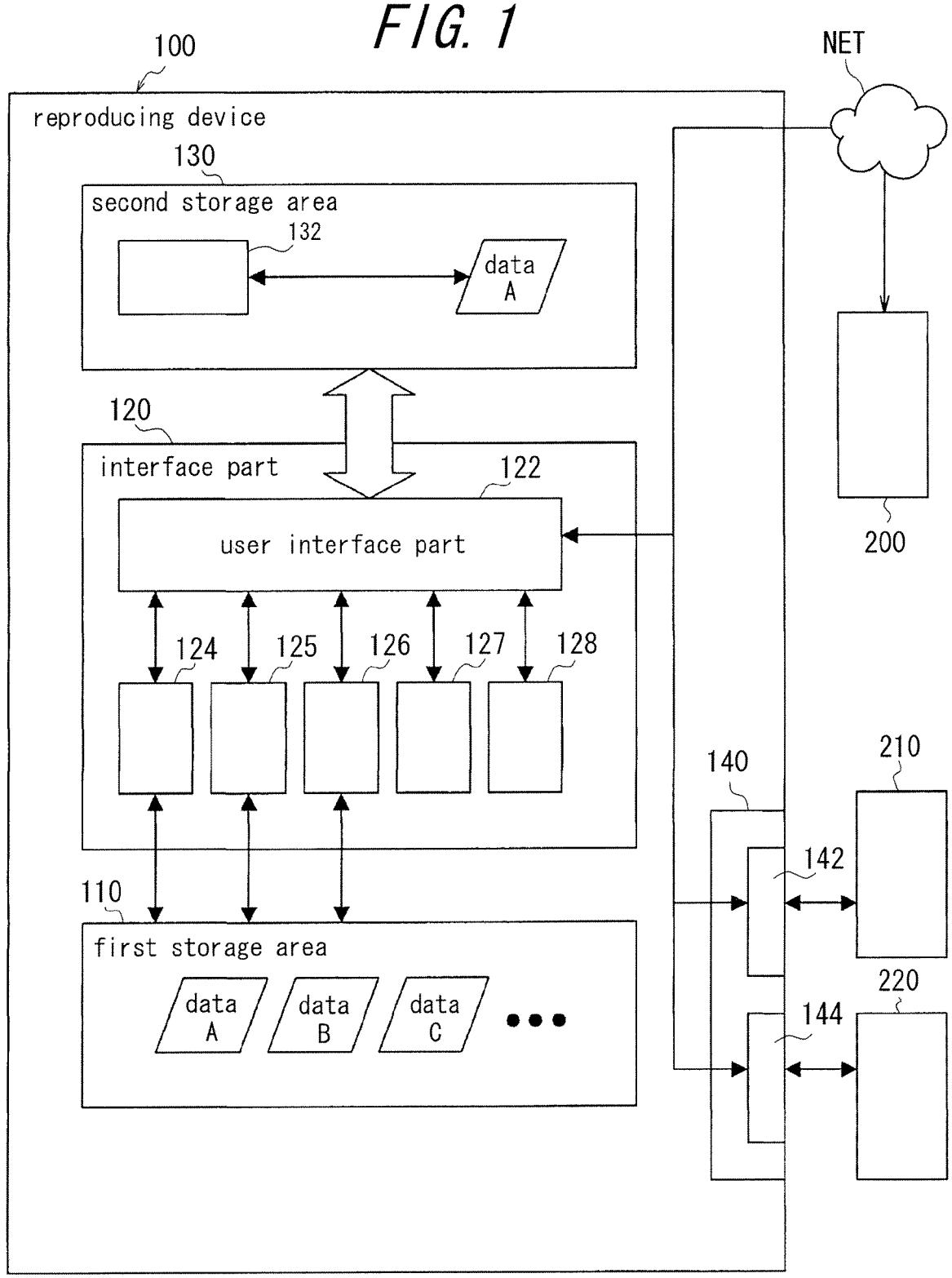
FIG. 1 is an overall view of the reproducing device of the present invention.

Hereinafter, the embodiments of the present invention will be described in detail with reference to the drawings. FIG. 1 is an overall view of the reproducing device 100 of the present invention. The reproducing device 100 has a first storage area 110, an interface part 120, a second storage area 130 and an input connector part 140. Data "A", data "B", data "C" and the like are stored in the first storage area 110. The interface part 120 has a user interface part 122, an initializing part 124, an acquiring interface part 125, a reproducing interface part 126, a monitoring part 127 and a communication part 128. The second storage area 130 has a reproducing part 132, which reproduces data "A" stored in the second storage area 130 or the data stored in the first storage area 110. The input connector part 140 has an analog input connector 142 and a digital input connector 144.

The data supplied to the reproducing device 100 is obtained by being downloaded from a server 200 via the Internet NET. Alternatively, the data supplied to the reproducing device 100 may be analog content supplied from an analog reproducing device 210 (for example, a record player), or digital content supplied from a digital reproducing device 220 (for example, a CD player, a DVD player and a sound card). The data obtained from the external data supply device is acquired by the user interface part 122 with being controlled by the communication part 128, and stored in the first storage area 110, the second storage area 130 or other area (not shown) in the reproducing device. The second storage area 130 uses the file system, which is supported by the operating system of the reproducing device 100, while the first storage area 110 uses the file system, which is not supported by the operating system so that the first storage area 110 cannot be accessed by a user. The interface part 120, which connects the first storage area 110 and the second storage area 130, supports the file system of the first storage area 110. The interface part 120 can be accessed from the second storage area 130 only through the user interface part 122 and therefore, process in the interface part 120 is hidden from the outside.

Figure 2:
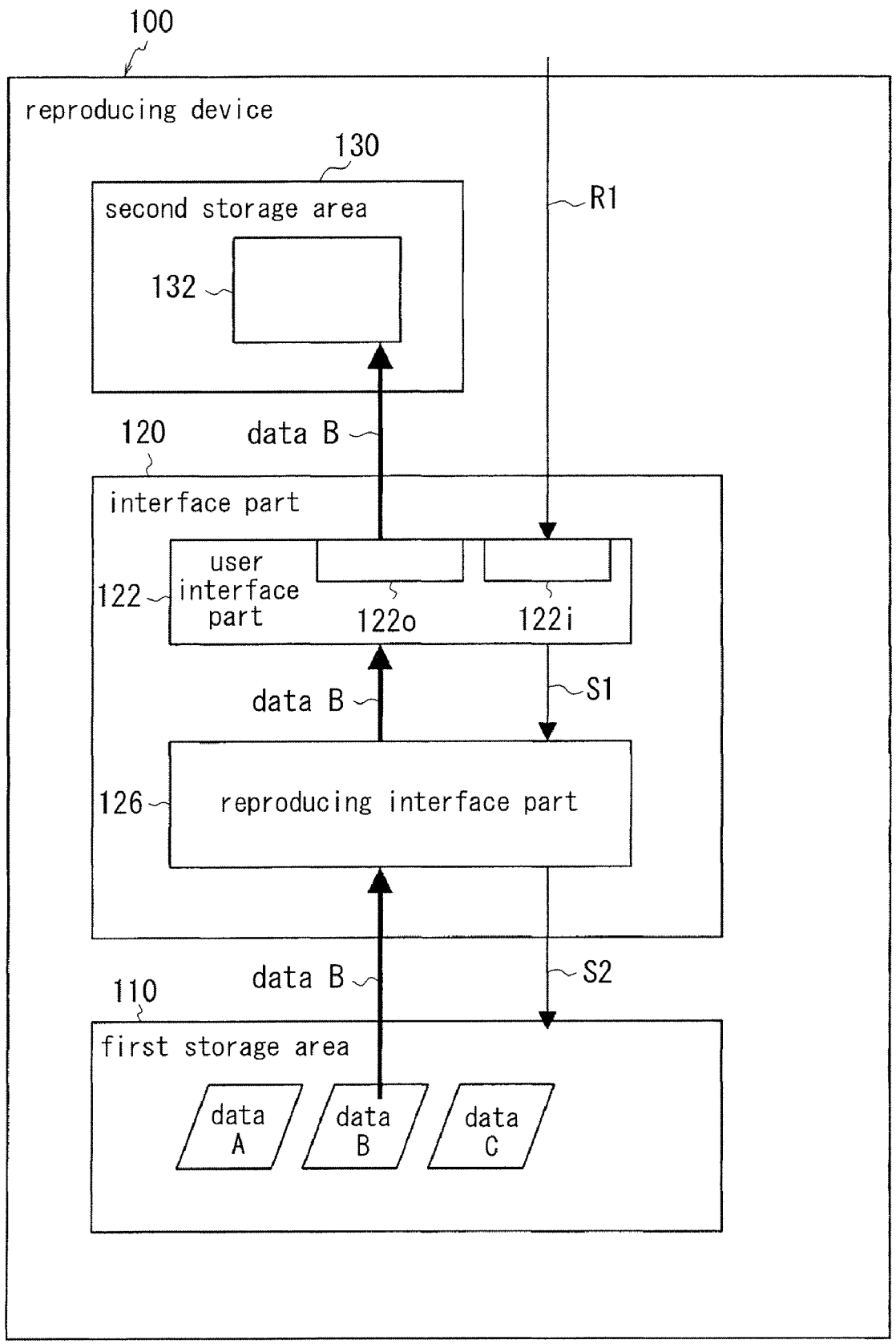
FIG. 2 is a block diagram of the reproducing device according to an embodiment of the present invention.

FIG. 2 is a block diagram of the reproducing device 100 according to an embodiment of the present invention. The User interface part 122 has an input port 122i and an output port 122o, through the input port 122i, a reproducing request R1 from a user is accepted and the requested data is supplied through the output port 122o to the reproducing part 132. A reproducing request signal S1 passes through the input port 122i of the user interface part 122 and it is converted into a reading request signal S2 in a reproducing interface part 126. The reading request signal S2 is transmitted to the storage area 110, data (for example, data "B" in FIG. 2) in response to this reading request signal S2 is transferred to the reproducing interface part 126, and then transferred through the output port 122o of the user interface part 122 to the reproducing part 132 of the second storage area 130. The reproducing part 132 reproduces thus-transferred data "B". In the interface part 120, converting, reading, transferring and supplying operations are hidden from a user, and therefore, a user can access the interface part 120 only through the user interface part 122.

In a preferred embodiment of the present invention, the reproducing request R1 from a user shown in FIG. 2 is a stream-reproducing request, readout data is supplied in a streaming reproduction form and the reproducing part 132 is a stream-reproducing part for streaming reproduction.

Figure 3:
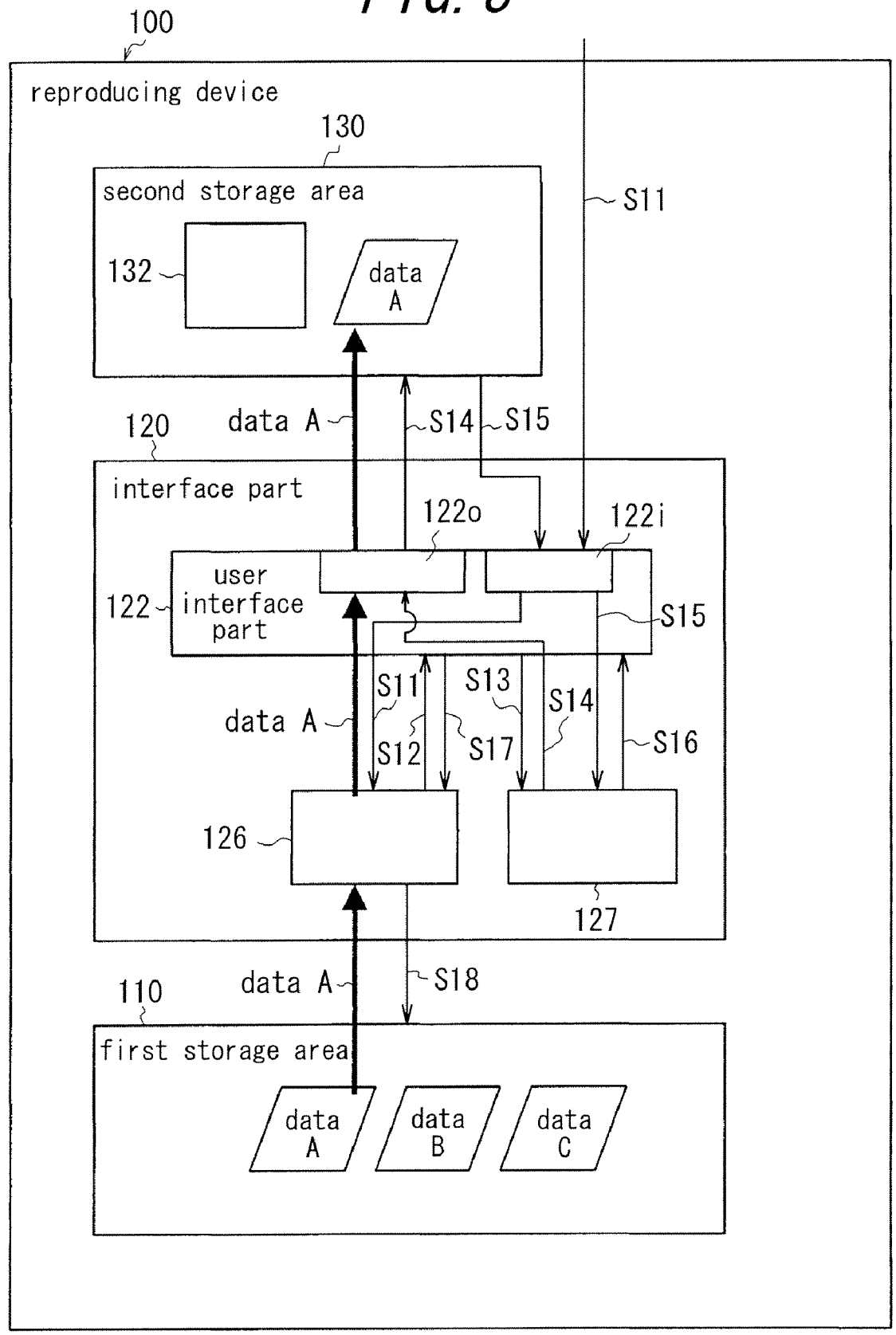
FIG. 3 is a block diagram of the reproducing device according to another embodiment of the present invention, showing a signal and data flow disclosing reproduction data to the second storage area 130.

Storing data in the first storage area 110 has advantage as follows, in comparison to the case of storing data created with robust protection/coding processing in the second storage area 130. Firstly, the second storage area 130 uses the file system supported by the operating system (OS) of the reproducing device 100 and since a user-friendly environment (for example, Windows™) is preferable, plenty of information and analysis tools are available, and therefore its encryption function is very likely to be broken. Secondly, a hard disk, of which data is stored in the second storage area 130, is physically detached, and attached to other devices having the same file system, or only the OS region of the second storage area 130 is re-installed so that the data can be duplicated. On the other hand, since the first storage area 110 uses the file system, which is not supported by the operating system of the reproducing device 100, the first storage area 110 is unlikely to be accessed. In addition, general users cannot recognize a storage area in itself that the OS of a device in use does not support and they cannot recognize even more data stored therein. Therefore, music data stored in the first storage area 110 of the reproducing device 100 is kept in a secure state, in short, hidden from general users even though it is not encrypted. Thus, according to the present invention, it is possible to store unencrypted sound source data in the first storage area 110 while keeping its secrecy. In addition, even if the first storage area 110 is physically detached and attached to other devices, it is extremely difficult for general users to access data stored in the first storage area 110 because the first storage area 110 does not support general OS. In addition, if the first storage area 110 is formatted using the special file system which is not supported by UNIX™ or the like, the secrecy of the first storage area 110 improves more. As a result, as long as any special tools are used, without the device of the present invention, it becomes virtually impossible to access the first storage area 110 and data stored therein FIG. 3 is a block diagram of the reproducing device according to another embodiment of the present invention, showing a signal and data flow disclosing reproduction data to the second storage area 130. A reproducing request signal S11 from a user is supplied through the input port 122i of the user interface part 122 to the reproducing interface part 126. A data disclosure authorizing request signal S12 is transmitted from the reproducing interface part 126 to the user interface part 122. A second storage area security status confirming request signal S13 is transmitted from the user interface part 122 to the monitoring part 127. A second storage area security status acquiring request signal S14 is transmitted from the monitoring part 127, through the output port 122o to the second storage area 130. A second storage area security status signal S15 is transmitted through the input port 122i to the monitoring part 127. A reproduction authorization signal S16 is transmitted from the monitoring part 127 to the user interface part 122. A reproducing request signal S17 is transmitted from the user interface part 122 to the reproducing interface part 126. A reading request signal S18 is transmitted from the reproducing interface part 126 to the first storage area 110. The data (for example, data "A" in FIG. 3) in response to this reading request signal S18 is transferred to the reproducing interface part 126, passes through the output port 122o of the user interface part 122 and then is stored in the second storage area 130. The stored data "A" is reproduced in the reproducing part 132. In the example of FIG. 3, security status of the second storage area kept secure, however, when the second storage area 130 is not kept secure, the second storage area 130 is controlled, if necessary and changed in the secure state.

Figure 4:
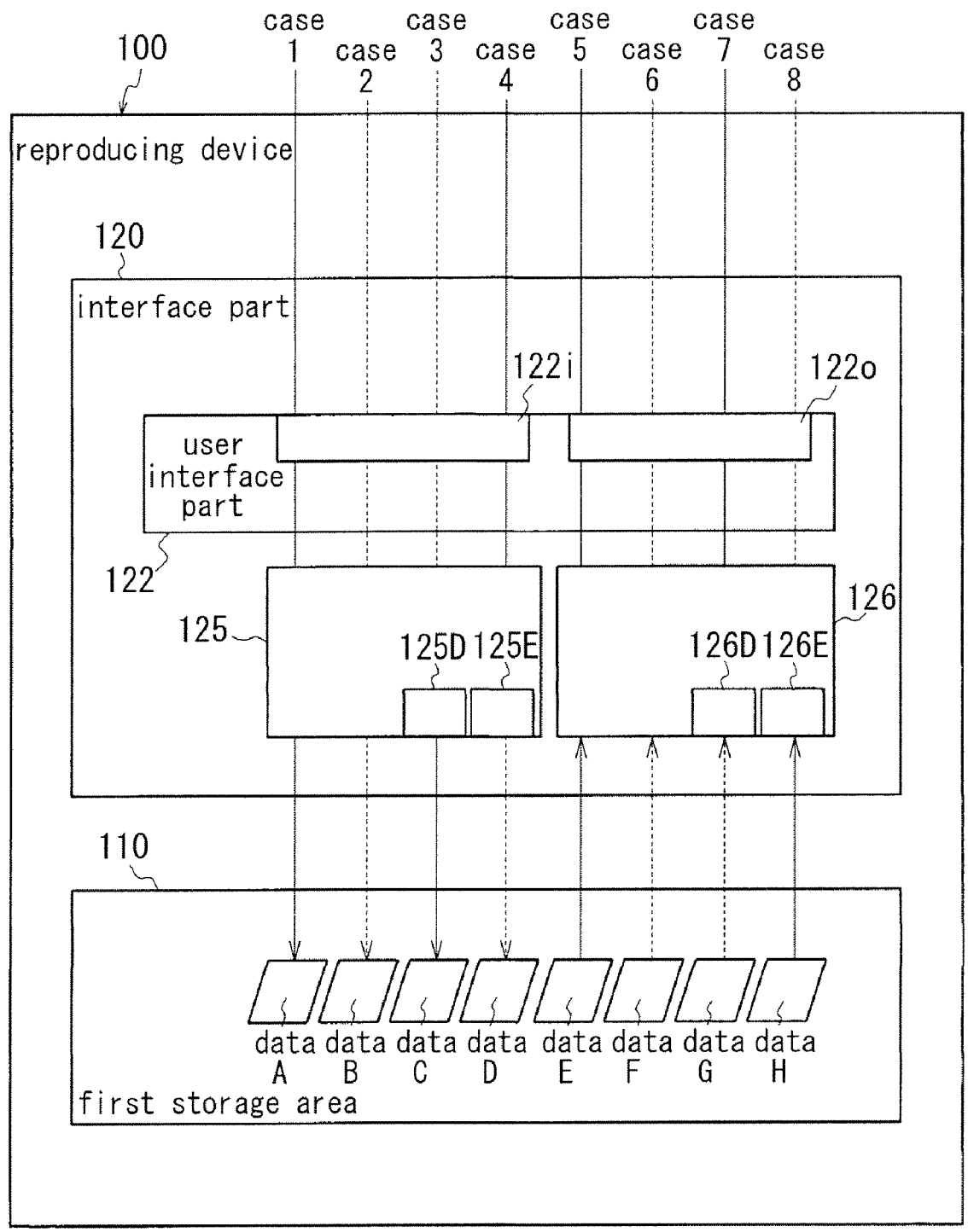
FIG. 4 is a block diagram of the reproducing device according to another embodiment of the present invention.

FIG. 4 is a block diagram of the reproducing device 100 according to another embodiment of the present invention, showing encryption and decryption in data acquisition and reproduction. In FIG. 4, solid arrows show unencrypted data and dotted arrows show encrypted data. The data is supplied through the input port 122i of the user interface part 122 to the acquiring interface part 125 and stored in the first storage area 110 in its original form or in an encrypted/decrypted form. Next, the stored data in its original form or after encrypted/decrypted in the reproducing interface part 126 is output from the output port 122o of the user interface region 122.

The following cases are considered as a data acquiring method.

Case 1: When encryption is unnecessary in a recording operation, for example, unencrypted data is stored in the first storage area 110 in its original form.

Case 2: The acquired data, which is encrypted, is stored in the first storage area 110 in its original form, i.e. in the encrypted form.

Case 3: The acquired data, which is encrypted, is decrypted in the decrypting part 125D of the acquiring interface part 125 and stored in the first storage area 110.

Case 4: When encryption is necessary in a recording operation, unencrypted data is encrypted in the encrypting part 125E of the acquiring interface part 125 and stored in the first storage area 110.

In addition, the following cases are considered as a data reproducing method.

Case 5: The unencrypted data is supplied through the reproducing interface part 126 in it original form and output from the output port 122o of the user interface part 122.

Case 6: When the stored data, which is encrypted, is decrypted by reproducing software, the encrypted data is just supplied from the output port 122o of the user interface part 122.

Case 7: The stored data, which is encrypted, is decrypted in the decrypting part 126D of the reproducing interface part 126 and supplied from the output port 122o of the user interface part 122.

Case 8: When the data is encrypted at the time of data reading in a backup operation, the unencrypted data is encrypted in the encrypting part 126E of the reproducing interface part 126 and supplied from the output port 122o of the user interface part 122.

Figure 5:
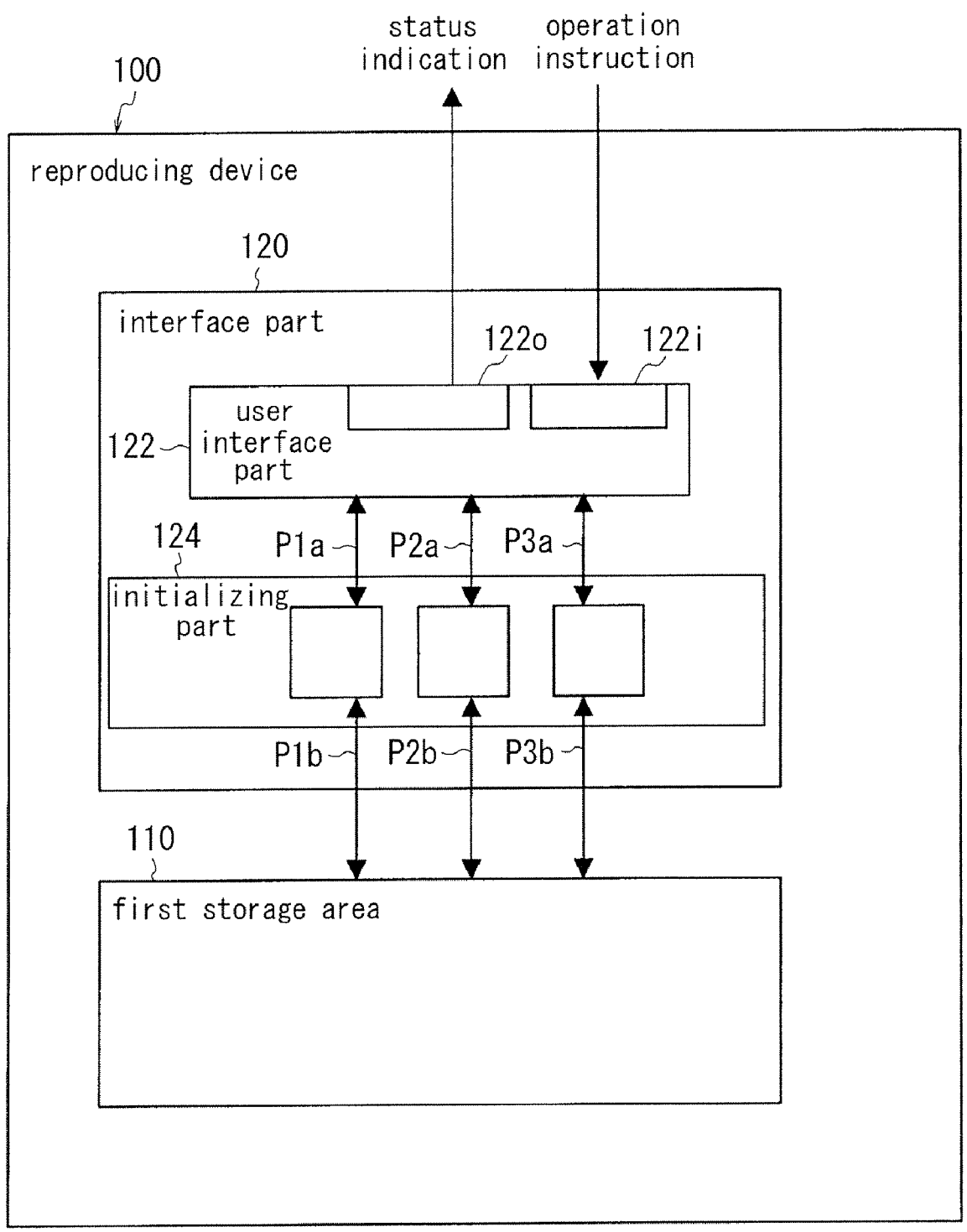
FIG. 5 is a block diagram of the reproducing device according to another embodiment of the present invention.

FIG. 5 is a block diagram of the reproducing device 100 according to another embodiment of the present invention, showing the initialization of the second storage area 130. In the interface part 120, the input port 122i accepts operating instructions and the user interface part 122 creates physics partition (process P1a, P1b), assuming that the first storage area 110 supports UNIX™ system OS. Next, the user interface part 122 creates and initializes the file system, which is not supported by the operating system of the reproducing device 100 (process P2a, P2b). Next, a storage area of data, such as databases are created and initialized (process P3a, P3b). When the above-mentioned processed are completed, status indication is output from the output port 122o.

Figure 6:
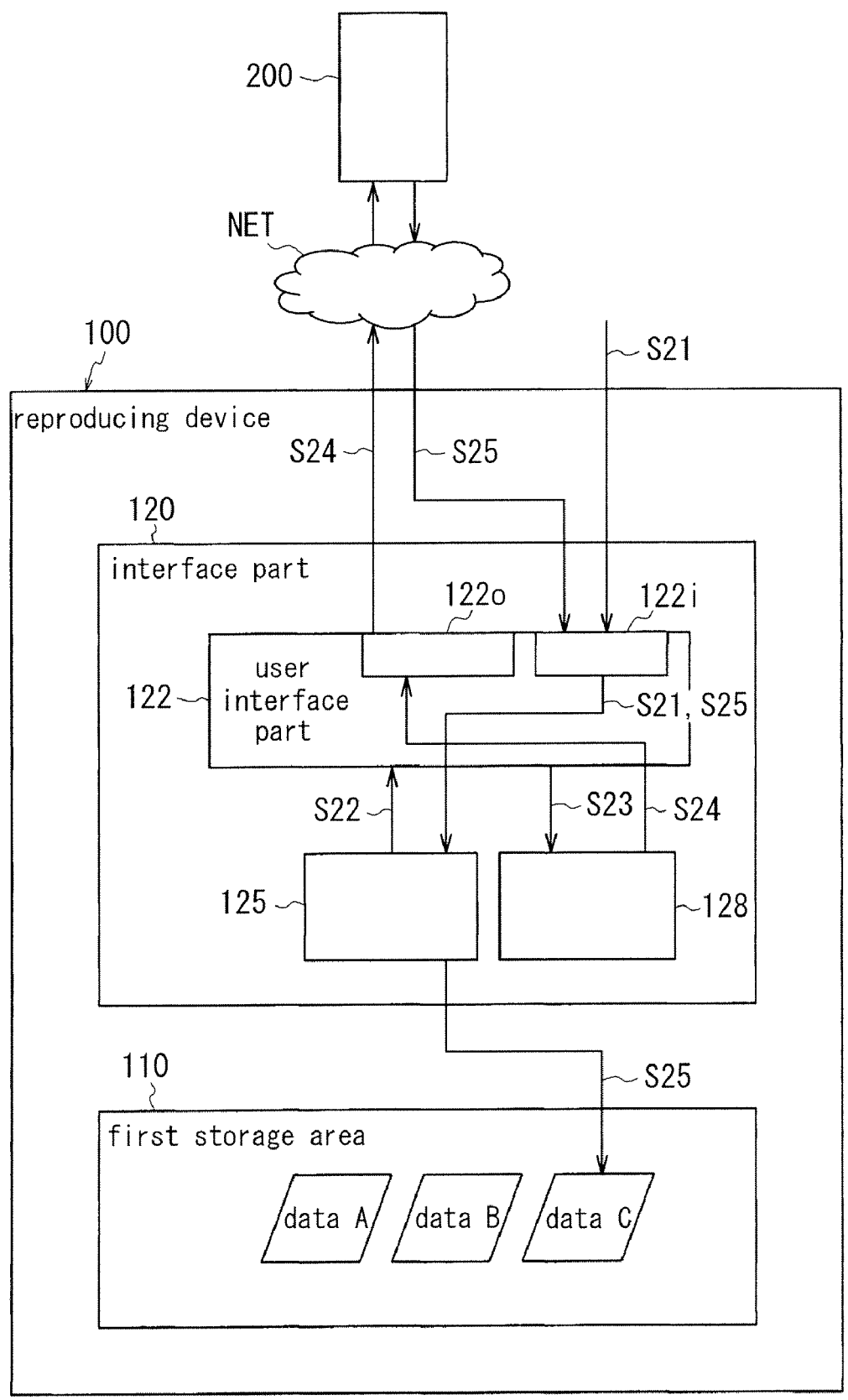
FIG. 6 is a block diagram of the reproducing device according to another embodiment of the present invention.

FIG. 6 is a block diagram of the reproducing device 100 according to another embodiment of the present invention, showing a flow that content is downloaded from a server to be stored in the first storage area 130. A data acquiring request signal S21 from a user is supplied through the input port 122*i* of the user interface part 122 to the acquiring interface part 125. A data acquiring request signal S22 is supplied from the acquiring interface part 125 to the user interface part 122. A data acquiring request signal S23 is supplied from the user interface part 122 to the communication part 128. A data acquiring request signal S24 is transmitted from the communication part 128 through the output port 122*o* of the user interface part 122 to a server 200, which is an external device via the Internet NET. An acquired data signal S25 is transmitted from the server 200 through the input port 122*i* of the user interface part 122 and the acquiring interface part 125 to be stored in the first storage area 110 (data "C" in FIG. 6).

Figure 7:
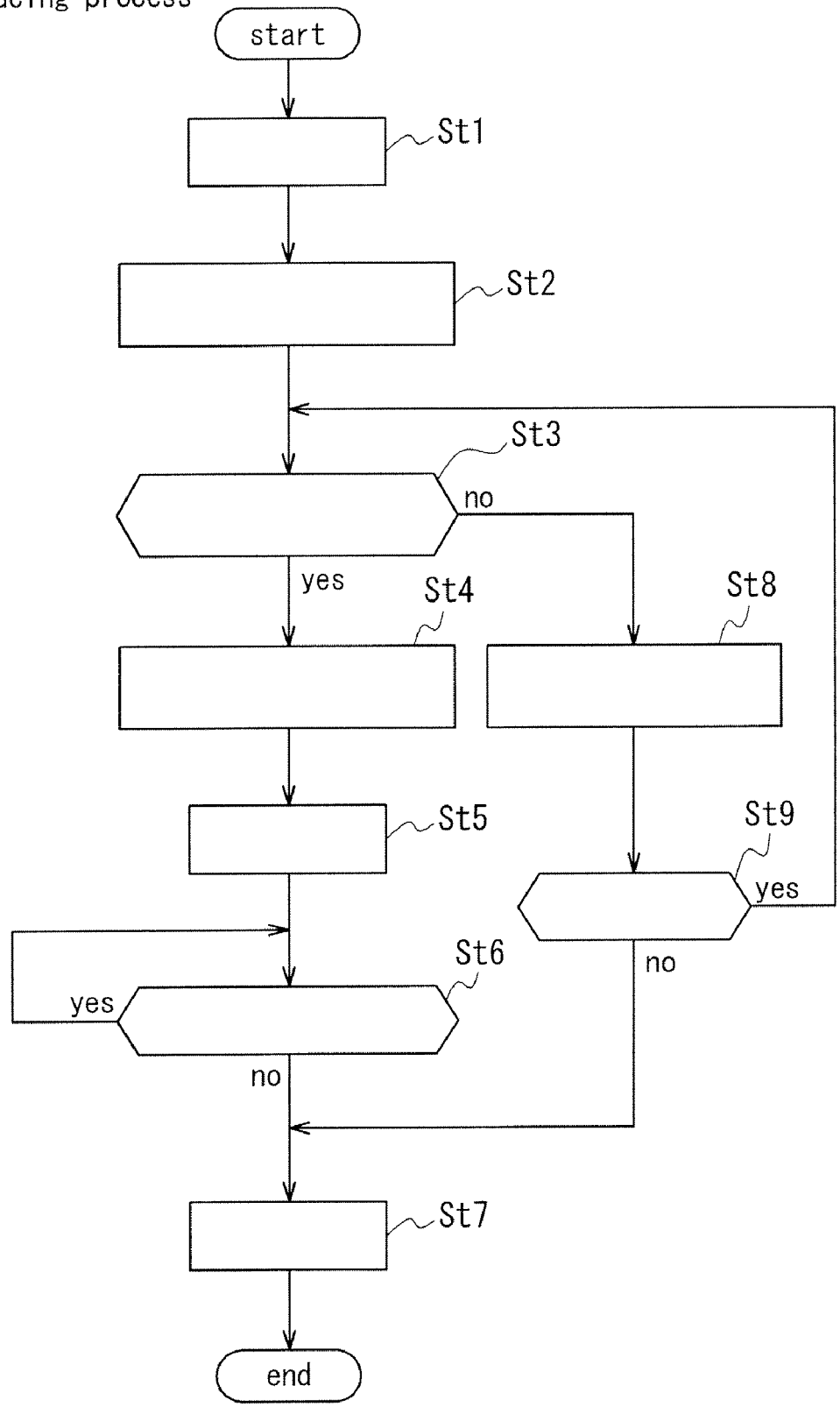
FIG. 7 is a flow chart of reproducing process of the interface part of the reproducing device of the present invention.

FIG. 7 is a flow chart of reproducing process of the interface part of the reproducing device of the present invention. In step St1, a reproducing request from a user is accepted in the interface part. In step St2, the reproducing request from the interface part is received in the monitoring part, which monitors secrecy of the second storage area. In step St3, it is judged whether the second storage area is kept in secret. If yes in step St3, in step St4, data stored in the first storage area is disclosed and supplied to the reproducing part by the interface part. In step St5, a termination request is accepted. In step St6, it is judged in the interface part judges whether there is a termination request and the interface part keeps waiting for a termination request. When a termination request is received in the interface part, in step St7, a termination process proceeds.

In step St3, if it is judged that the second storage area is not kept in secret, in step St8, the second storage area is changed to a secure state. In step St9, secrecy of the second storage area is judged and when it is judged that the second storage area is kept in secret, the process moves to step St3 and otherwise to step St7.

Figure 8:
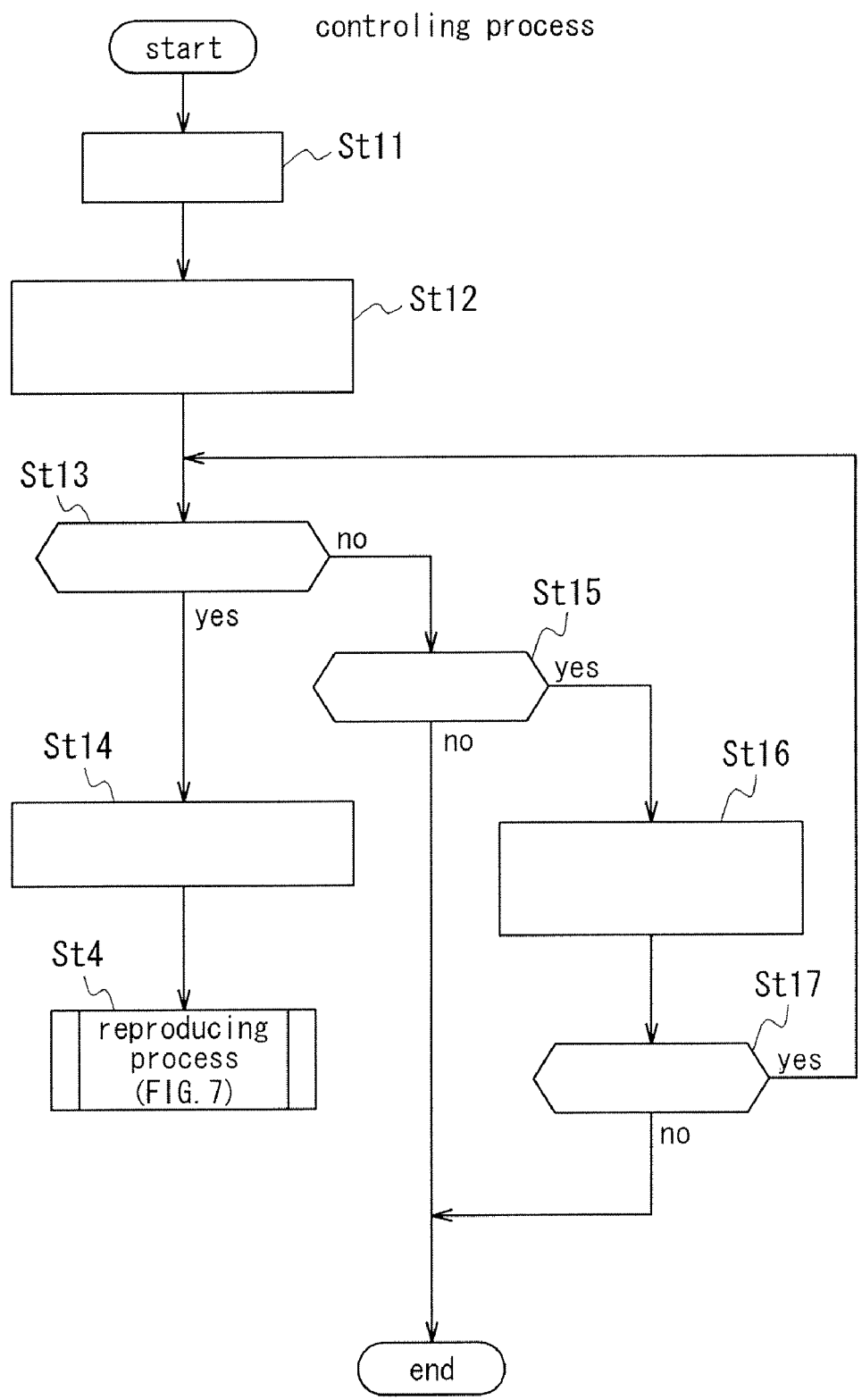
FIG. 8 is a flow chart of controlling process of the interface part of the reproducing device of the present invention.

FIG. 8 is a flow chart of controlling process of the interface part of the reproducing device of the present invention. In step St11, the interface part accepts a reproducing request from a user. In step St12, the monitoring part, which receives the reproducing request from the interface part, monitors the secrecy of the operating system. The monitoring part monitors, for example, (1) authority of a logon user is normal, (2) folder or file access permission of a hard disk area in the operating system is kept secure, (3) no unnecessary devices are connected, (4) no unnecessary applications and services are running, and (5) system setting such as policy registry is kept normal. In step St13, if it is confirmed that the operating system is kept secure, in step St14, data stored in the first storage area is disclosed and supplied to the reproducing part by the interface part.

In step St13, it is judged whether the operating system is kept in secret of not. When the operating system is not kept in secret, in step St15, it is judged whether the operating system is controllable. If the operating system is controllable, in step St16, the state of the operating system is changed in a secure state. The changes are, for example, (1) change of the authority of a logon user, (2) change of the folder or file access permission of a hard disk area in the operating system, (3) stop or invalidation of any unnecessary devices, (4) stop of any unnecessary applications and services, and (5) change of the system setting such as policy registry. In step St17, it is judged whether the state of the operating system could be changed in a secure state, and if yes, the process returns step St13 and if no, this control process is finished. In step St15, this control process is also finished when the operating system is not controllable.

Figure 9:
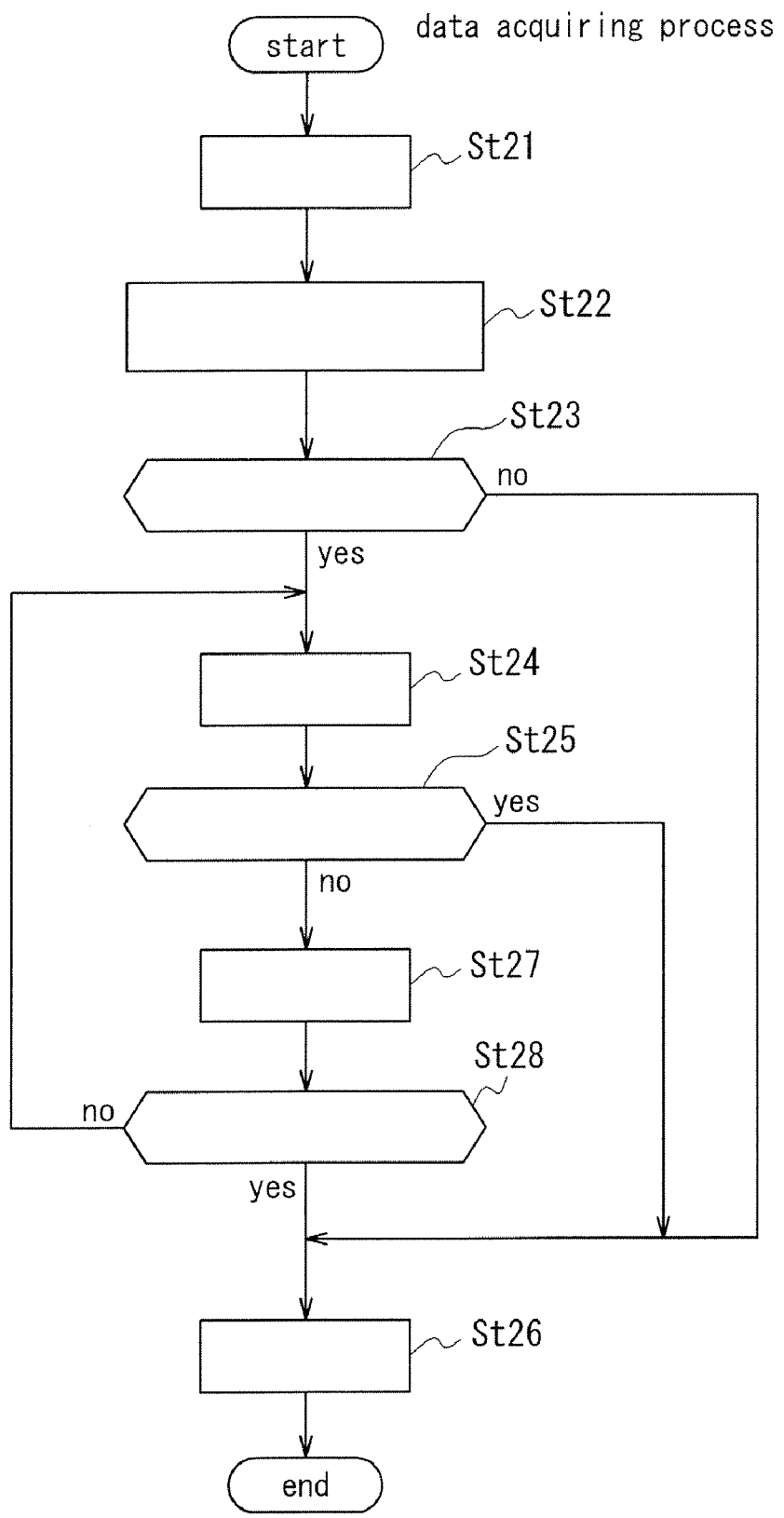
FIG. 9 is a flow chart of data acquiring process of the interface part of the reproducing device of the present invention.

FIG. 9 is a flow chart of data acquiring process of the interface part of the reproducing device of the present invention. In step St21, the interface part accepts an acquiring request from a user. In step St22, the interface part is connected to an external data supply device. The external data supply device is for example, a server via networks such as the Internet, a CD/DVD drive and a sound card. In step St23, it is judged whether the interface part could be connected to an external data supply device. If yes, in step St24, the interface part acquires data from the external data supply device and the acquired data is stored in the first storage area. In step St25, it is judged whether the acquisition of data is finished. If yes, in step St28, termination process proceeds and this data acquiring process is finished. If no in step St25, in step St27, a termination request is accepted. In step St28, it is judged whether there is a termination request or not and if yes, the process moves to the termination process of step St26. In step St28, if there is no termination request, the process returns step St24 and the data acquiring process is continued.

What is claimed is:

1. A reproducing device comprising:
    a first storage area, in which data is stored, said first storage area using a file system which is not supported by an operating system of the reproducing device;
    an interface part supporting both of the file system used by the first storage area and a file system supported by the operating system of the reproducing device, said interface part including a user interface part accessible from outside of the reproducing device, and an acquiring and reproducing interface part configured to accept only reproducing requests for reproducing the data stored in the first storage area, supplied through the user interface part, and for reading out and supplying the data stored in the first storage area, wherein the reading out and supplying operations are hidden from a user; and
    a reproducing part for reproducing the data supplied through the acquiring and reproducing interface part, said reproducing part using the file system supported by the operating system of the reproducing device.

2. The reproducing device according to claim 1, wherein the reproducing requests are stream-reproducing requests, the interface part reads out the data stored in the first storage area and supplies the date to the reproducing part in a stream-reproducing form, and the reproducing part is configured as a stream-reproducing part for stream-reproducing the data supplied in the stream-reproducing form.

3. The reproducing device according to claim 1, wherein the interface part further comprises a monitoring part for judging whether the operating system of the reproducing device is secure or not, wherein when the monitoring part judges that the operating system is secure, the acquiring and reproducing interface part reads out the data stored in the first storage area and supplies the data to the reproducing part, and wherein when the monitoring part judges that the operating system is not secure, the interface part changes the operating system in a secure state, afterward, the acquiring and reproducing interface part reads out the data stored in the first storage area and supplies the data to the reproducing part, the interface part controls the operating system kept in the secure state, and the reproducing part reproduces the supplied data.

4. The reproducing device according to claim 1, wherein
    the reproducing device further comprises a second storage area used by the reproducing part,
    the interface part further comprises a monitoring part for judging whether the second storage area is a secure storage area or not, when the monitoring part judges that the second storage area is a secure storage area, the acquiring and reproducing interface part reads out the data stored in the first storage area and supplies the data to the second storage area, when the monitoring part judges that the second storage area is not a secure storage area the interface part changes the second storage area in a secure state, afterward, the acquiring and reproducing interface part reads out the data stored in the first storage area and supplies the data to the second storage area, the interface part keeps the second storage area in the secure state, and controls the second storage area so that the data supplied to the second storage area is stored, and the reproducing part reproducing the data stored in the second storage area.

5. The reproducing device according to claim 4, wherein the second storage area is an auxiliary storage device.

6. The reproducing device according to claim 1, wherein the data stored in the first storage area, readout operation of the data and supplying operation of the data are hidden from the user by encapsulation.

7. The reproducing device according to claim 1, wherein the data stored in the first storage area is encoded, and the acquiring and reproducing interface part decodes the encoded data.

8. The reproducing device according to claim 1, wherein the interface part comprises an initializing part having a formatting capability to format the first storage area in a file system which is not supported by the operating system of the reproducing device.

9. The reproducing device according to claim 1, further comprising a communication part configured to accept only an acquiring request for acquiring new data, wherein said communication part is configured to acquire new data from an external data supply device, and store the acquired new data in the first storage area, wherein the storing operation is hidden from the user.

10. The reproducing device according to claim 9, wherein the acquired new data and the storing operation are hidden by encapsulation.

11. A method for reproducing data by a reproducing device, comprising:

a step of storing data in a first storage area using a file system which is not supported by an operating system of the reproducing device, a step of reading out and supplying the data stored in the first storage area by using an acquiring and reproducing interface part configured to accept only reproducing requests for reproducing the data stored in the first storage area, the reproducing requests for reproducing the data being supplied from outside of the reproducing device, in an interface part supporting both of the file system which the first storage area uses and file system supported by the operating system of the reproducing device, wherein the reading out and supplying operations are hidden from a user; and a step of reproducing data supplied by the acquiring and reproducing interface part.

12. A non-transitory computer-readable medium storing a program for a computer to perform a reproducing method, the method comprising:

a step of storing data in a first storage area using a file system which is not supported by an operating system of the reproducing device;

a step of reading out and supplying the data stored in the first storage area by using an acquiring and reproducing interface part accepting only reproducing request for reproducing the data stored in the first storage area, the reproducing request for reproducing the data being supplied from outside of the reproducing device, in an interface part supporting both of the file system which the first storage area uses and file system supported by the operating system of the reproducing device, wherein the reading out and supplying operations are hidden from a user, and;

a step of reproducing data supplied by the acquiring and reproducing interface part.

* * * * *